Figure 1:
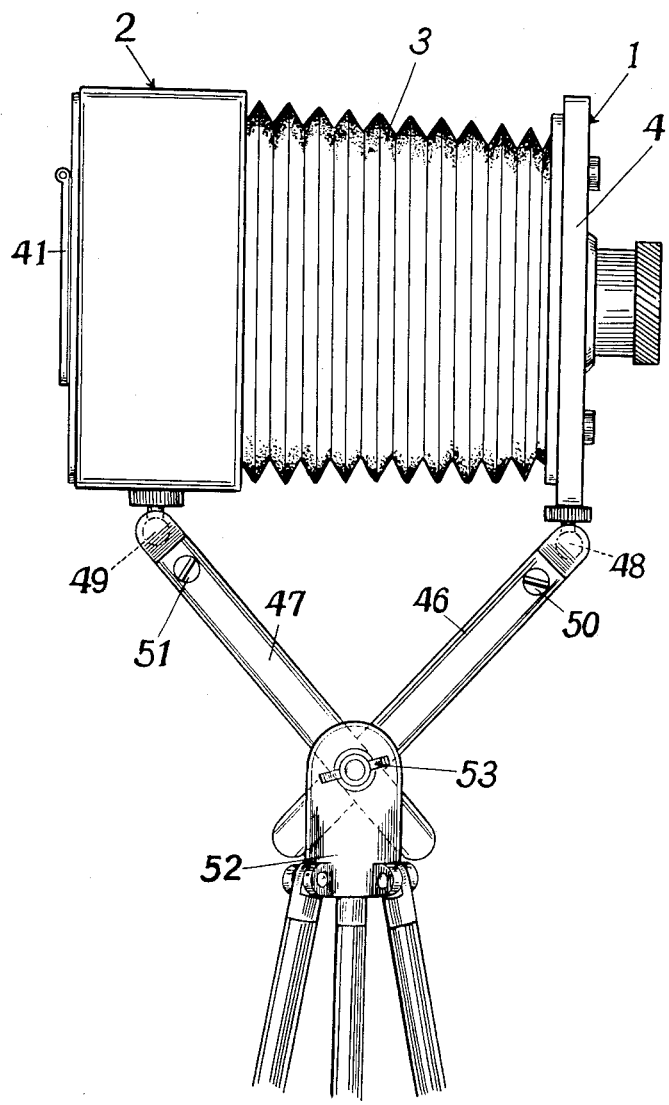

July 4, 1961 KUNJU CHATANI 2,990,760
PHOTOGRAPHIC CAMERA
Filed Dec. 30, 1959 3 Sheets-Sheet 2

INVENTOR
KUNJU CHATANI
BY
Morgan, Finnegan, Durham + Pine
ATTORNEYS.

July 4, 1961 KUNJU CHATANI 2,990,760
PHOTOGRAPHIC CAMERA
Filed Dec. 30, 1959 3 Sheets-Sheet 3

INVENTOR
KUNJU CHATANI
BY
Morgan, Finnegan, Durham & Pine
ATTORNEYS

United States Patent Office 2,990,760
Patented July 4, 1961

1

2,990,760
PHOTOGRAPHIC CAMERA
Kunju Chatani, Uchide, Ashiya, Japan, assignor to F. C. Seisakusho Co., Ltd., Nishinomiya, Japan
Filed Dec. 30, 1959, Ser. No. 862,942
Claims priority, application Japan June 11, 1956
7 Claims. (Cl. 95—50)

This application is a continuation-in-part of my copending application Serial Number 663,971 filed June 6, 1957 and now abandoned.

The present invention relates to improvements in cameras of the so-called view type. More particularly the present invention relates to an apparatus for the maintaining of the parallel relation existing between the lens and the photographic emulsion mounted at opposite ends of a light-impermeable bellows.

The usual relation between the lens of a camera and the portion on which is mounted the light sensitive photographic emulsion is that of being parallel. In the commercial view camera the lens is mounted on a board to which is securely attached one end of an expandible light-impermeable bellows, the other end of which has attached to it a frame member in which can be mounted photosensitive material in the form of a plate or cut film. This parallel relation is necessary in order to obtain a uniformly sharp image on the negative, which is the result of the proper focusing of light on the photosensitive emulsion by the lens. Camera lenses are ground in such a manner to obtain this result when the plane of the lens and the plane of the surface on which it is focused are parallel.

Conventional professional cameras, as exemplified by that of the view type, are constructed in such manner that the frame in which the photosensitive plate or cut film is held and the mounting board on which the lens is carried may be moved independently one of the other because of the flexible bellows connection between the two. The frame and the mounting board are usually focused on a single track in such manner that they are respectively adjustable in a forward or backward path along said track. The operation of such an apparatus and particularly in maintaining the parallel relation of the lens with the photosensitive material held by the rear frame presents serious difficulties. The angle of inclination of the one member must coincide with the angle of inclination of the other member, which corelation is extremely difficult to judge even if a ground glass focusing screen is available.

An object of the present invention is to provide means for constantly maintaining the parallel relation between the lens supported on the mounting board and the photosensitive emulsion carried on the rear frame member.

An object of the present invention is to provide means for constantly maintaining the parallel relation between the lens supported on the mounting board and the photosensitive emulsion carried on the rear frame member.

Another object of the present invention is to provide means for maintaining the parallel relation between the lens and the photographic emulsion independently of the distance between the lens mounting board and the frame holding the photographic emulsion.

A further object of this invention is to provide means for moving the lens and the photographic emulsion simultaneously in the same direction.

Two planes, connected by three or more parallel cables under tension said cables being of initially uniform length, are always parallel irrespective of the ultimate angle between the wires and the planes. In this case both polygons in these two plates which are respectively formed with the connecting points are congruent.

2

The present invention has been designed to embody the principles set forth above for the maintenance of the parallel relation between the plane of a lens and the plane of a photographic emulsion where the connecting link between the two planes is flexible. The lens mounting board and the rear frame in which is mounted a plate comprising photographic emulsion or cut film are connected by three or more flexible, parallel cables of uniform length and under constant, even tension which combination functions in such manner as to maintain the lens on its mounting board and the photographic emulsion carried on the rear frame in parallel relation. In this apparatus the mounting board on which is carried the lens and the rear frame are connected according to the present invention. Movement by the plane of the one is duplicated by the plane of the other. In the specific embodiment, illustrated in the accompanying drawings, the rear frame member acts as a handle for moving the lens mounting board. The lens mounting board has extending from it at the bottom a ball which articulates with a socket in a support member and functions as a universal joint therefor. A corresponding ball depends from the rear frame member and in turn fits into a corresponding socket in a second support member which support members cooperate in such manner that the distance between the sockets receiving said balls may be varied over a considerable linear distance and also be locked in place. Once the distance between the sockets has been determined and the means in which said sockets are provided are locked in place any inclination or declination with respect to one of the frame members in its universal joint is transmitted via the cables connecting it to the other member so that the second member inclines or declines correspondingly. Provision is also made for locking the universal joints after a satisfactory angle has been achieved.

The lengths of the cables which provide for the paralleling of the lens mounting board and the rear frame member are capable of extension in that they are wound on a drum which imparts tension to them through a helical spring or the like but which are nevertheless extendable.

Thus in the camera designed in accordance with the present invention, after determining the distance between the lens mounting board and the rear frame member which provides for accurate focusing, the angle of inclination or declination of the lens is readily and accurately adjustable through the medium of inclination or declination and the rear frame member.

Figure 2:
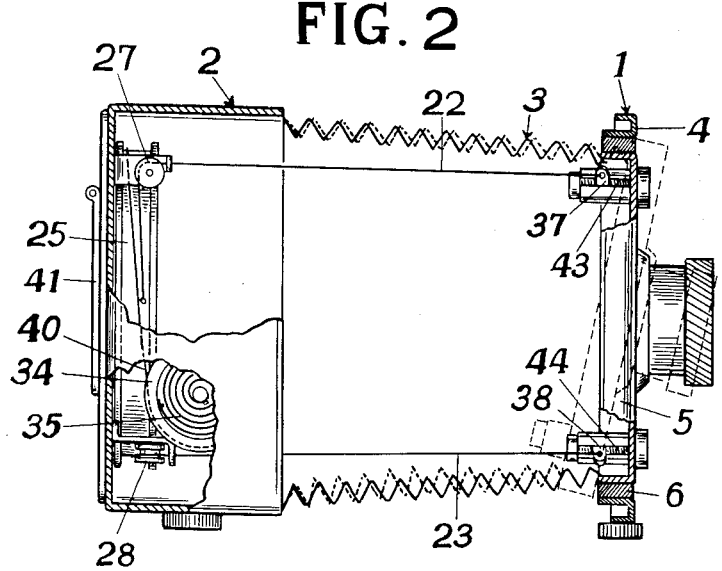
Figure 3:
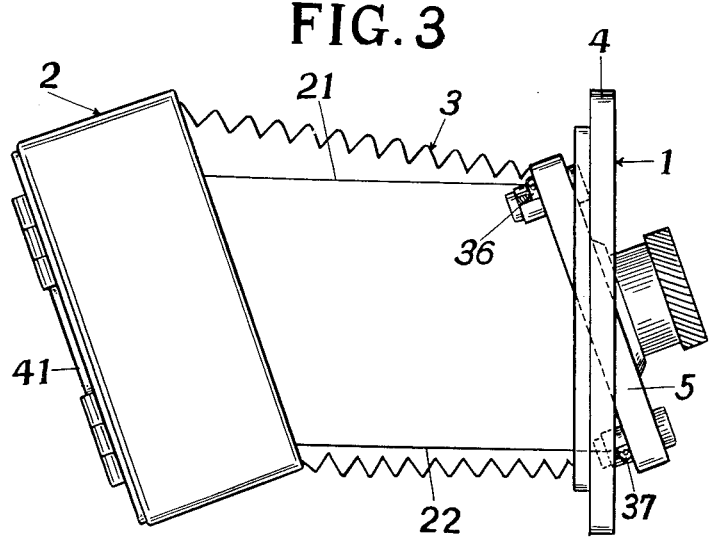
Figure 4:
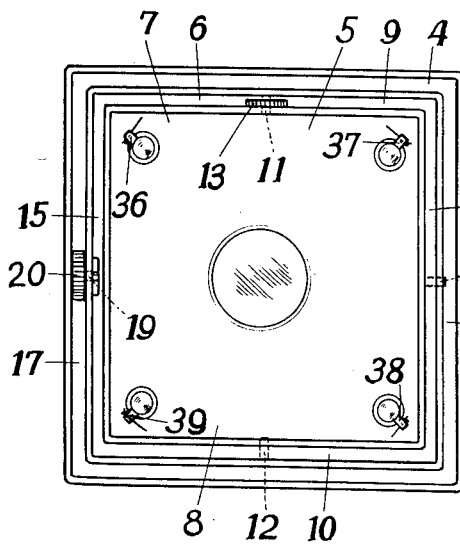
Figure 5:
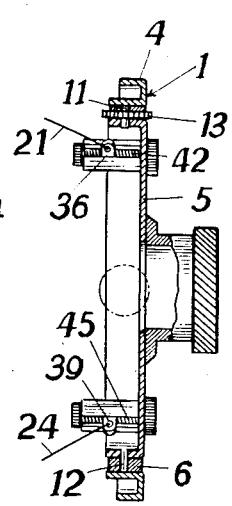
Figure 6:
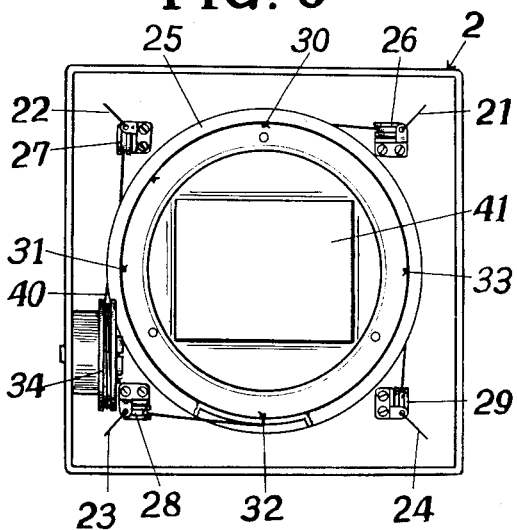
Figure 7:
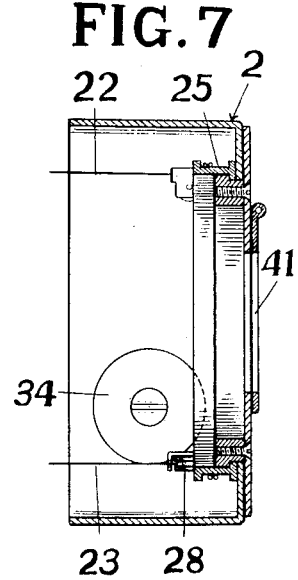

In the accompanying drawings, forming a part of the specification, and in which like numerals are employed to indicate like parts throughout the same, FIGURE 1 is a side view of a camera according to the present invention, FIGURE 2 is a side view partially broken away and partially sectioned showing detail of the camera proper, FIGURE 3 is a side plane view of the camera in which the bellows has been cut away and the lens mounting board and the rear frame have been tilted upward, FIGURE 4 shows the inside of the front end of the camera, FIGURE 5 is a sectional view from the side of the front end of the camera, FIGURE 6 shows the inside of the rear end of the camera, and FIGURE 7 is a sectional view from the side of the rear end of the camera.

Referring now more particularly to the drawings there is shown a front frame member 1 and a rear frame member 2 connected by an expansible, light-impermeable, flexible two-way bellows 3, the composite front frame 1 is subdivided into a fixed frame 4 and the lens mounting board 5 which is articulated to fixed frame 4 by means of a pair of gimbals, the lens mounting board 5 is positioned inside of intermediate frame 6 which is concentrically disposed inside of the fixed frame 4. The lens mounting board 5 is connected at the center of both its upper side 7 and its lower side 8 to the intermediate frame 6 at its respective centers on corresponding side 9 and 10 by pins 11 and 12 so that the lens mounting board 5 can be turned at will on the axis formed by connecting pins 11 and 12. A locking means 13 is provided for locking the lens board 5 to the intermediate frame 6 at any angle. The intermediate frame 6 is connected at both its center points on sides 14 and 15 to the outer frame 4 at the respective centers of the corresponding sides 16 and 17 of frame 4 by means of pins 18 and 19 so that the intermediate frame 6 together with the lens mounting board 5 can be turned at will on the axis defined by connecting pins 18 and 19. A locking means 20 is provided for locking the intermediate frame 6 to the outer frame 4 at any angle.

The outer frame 4 is stationary. The lens mounting board 5 as a consequence of being mounted in double gimbals can be turned around the horizontal axis together with the intermediate frame 6 which is pivoted on the stationary frame 4. Lens mounting board 5 may also be caused to turn about its vertical axis independently of intermediate frame 6 or fixed frame 4. Movement may be caused to occur simultaneously both about the vertical and horizontal axes of lens mounting board 5.

Other types of mountings for the lens mounting board may be substituted for the double gimbaled mounting described above if they permit universal movement of said lens mounting board.

According to the present invention, the rear frame member 2, on which is supported photosensitive material such as plates or cut films, is connected to the lens mounting board 5 of the opposite composite front frame 1 by three or more parallel wire cables of uniform length and under uniform tension. In the specific embodiment shown in FIGURES 4, 5, 6 and 7, four wire cables 21, 22, 23 and 24, are strung between the rear frame member 2 and lens mounting board 5 in such manner as to connect the corners of two congruent squares. These wires must be flexible and resist distortion due to tension. Fine wire cable, hemp thread or gut, have been found suitable for this purpose.

The respective ends of wire cables 21, 22, 23 and 24 are secured on the periphery of a drum 25 at points 30, 31, 32 and 33 respectively, and pass through corresponding blocks, each of which is located on the corner of a square, on rear frame member 2. The drum 25 which rotates freely is mounted on the inner side of rear frame member 2 has been given a strong turning effect in one direction by means of a cable 40 attached to its perimeter, the other end of which is wound around a pulley 34 on which force is exerted by a coiled spring 35. This device provides a pull on the drum 25 in the direction opposite that exerted by cables 21, 22, 23 and 24, thereby imparting a uniform tension to these four wire cables, the other ends of which are fixed to adjustable eyes mounted on the inner surface of lens mounting board 5. The length of the wire cables between the respective eyes and the corresponding blocks is always kept equal due to the uniformity of the tension exerted upon them which in turn is due to the torsional force exerted through drum 25, whatever the distance may be between rear frame member 2 and lens mounting board 5. The maintenance of this uniform tension which in turn maintains the uniformity of length of the wire cables results in the lens mounting board 5 always returning to a parallel relation to rear frame member 2 when the rear frame member 2 is moved.

Any movements of the plane defined by rear frame member 2 will include either motion about the horizontal axis or motion about the vertical axis or combinations of both. The lens mounting board 5 being mounted in the double gimbaled relation with the fixed outer frame 4 and intermediate frame 6 will be correspondingly moved about its vertical axis and its horizontal axis because of the equal length of the four parallel wire cables connecting it to rear frame member 2 so that the original parallel relation, once established, will be restored automatically.

Theoretically three wire cables would be enough to attain the above mentioned effect but it is preferred to use four wire cables as there seems to be greater ease in compensating for the movement of the rear frame member 2 in such a setup.

The eyes 36, 37, 38 and 39 to which the ends of the wire cables to the lens mounting board 5 are attached, may be extended or retracted to some degree by means of the respective adjusting screws 42, 43, 44 and 45. This is advantageous for adjusting the wire cables to an even tension and equal length, both initially and later for compensating for any changes in the length of the wire cables due to their stretching under tension, or the like. The adjusting screws could also be used in such special cases as where for technical reasons it might be desired to alter the parallel relation of the lens mounting board 5 and the rear frame member 2.

Though the structure is not shown in the drawings it is possible to position the rear frame member 2 at a desired angle with relation to the lens mounting board 5 by pushing aside some of the wire cables such as by means of plate cams.

In the specific embodiment shown in the drawings the lens mounting board 5 is not followed by the rear frame member 2 in the case of the former's turn about its vertical axis within the plane which includes the outer frame 4. There is, however, as a practical matter, neither necessity nor advantage in such an operation because it is desirable that the whole camera be inclined to the required angle for taking a photograph. In addition to that, the rear frame member 2 is provided with an aperture 41 on which the photosensitive material is mounted. The aperture 41 is adjustable with respect to the angle which it makes with the outer face of the rear frame member 2, so that the photosensitive material may be positioned at various angles to the object.

In accordance with the present invention the rear frame member 2 is always kept parallel with the lens mounting board 5 so that it is not necessary to provide the apparatus with a slide guide on which both the front and rear frames are placed in order that their inclination or declination may be measured with respective angle gauges. A camera designed in accordance with the present invention may be set up in a much simpler manner, such as that shown in FIGURE 1. Supporting members 46 and 47 are respectively connected at one end with the fixed outer frame 4 of the composite front frame 1 and to the rear frame member 2 at their bottom sides by universal joints 48 and 49 of the ball and socket type. Set screws 50 and 51 are used to fix the positions of universal joints 48 and 49. The other ends of supporting members 46 and 47 are mounted on a tripod and locked in place thereon by means of a locking means 53.

A method for setting up a camera of the type described in the specific embodiment is as follows:

(1) Aim the whole camera roughly at the object to be photographed, (2) Fix the supporting members 46 and 47 to the tripod 52 by means of the locking means 53 at such an opening angle that the object is focused on the photosensitive materials mounted on the rear frame member 2, (3) Lock the fixed outer frame 4 of the composite frame member 1 in position by tightening down set screw 50 on universal joint 48.

(4) Determine the direction of the lens by operating the rear frame member 2 locking each movable part of the composite front frame 1 with its respective locking means 20 and 13 and locking the rear frame member 2 to the supporting member 47 by tightening set screw 51 on universal joint 49.

The apparatus described above represents the preferred embodiment of the present invention. The same results as described therein may also be attained by using three or more parallel, coiled springs of uniform length and tension instead of said wire cable, drum and tensioning means as designed in the preferred embodiment.

What I claim is:

1. In a photographic camera, the combination with a lens board, a rear frame which is fitted with the sensitive material and an extendible bellows, of at least three parallel cable wires of a uniform length which are stretched between the lens board and the rear frame at their respective spaced apart position, one end of each wire being secured to the lens board, the other end portion of each wire being coiled around a freely rotatable spring tensioned drum on the rear frame at least two of said wires lying on opposite sides of the lens board and rear frame, the planes formed by the wires and their points of attachment to the lens board and rear frame being such that any change in the distance between the rear frame and lens board causes rotation of the spring-tensioned drum to equally lengthen or shorten the wires.

2. A photographic camera according to claim 1, in which the lens board is jointed to a fixed support by means of universal joint mechanism.

3. A photographic camera according to claim 1 in which spaced hooks are mounted on the lens board by individual adjusting screws and one end of each of the cable wires is attached to its individual hook.

4. A photographic camera according to claim 1, comprising two mounting rods pivoted on a tripod and having their free ends upwardly extending to the lens board and camera back, and universal joints by which the lens board and camera back are individually connected to the free ends of said mounting rods.

5. A photographic camera according to claim 1 in which four wires are used, and in which planes formed by the wires and their points of attachment to the lens board and rear frame are congruent.

6. A photographic camera according to claim 1 in which the lens board comprises a stationary frame and a movable frame supporting the lens, and to which the wires are attached, the movable frame being mounted in the stationary frame by double gimbals and being movable about its horizontal and vertical axes.

7. The photographic camera of claim 1 wherein the wires pass through individual blocks on the rear frame and extend from the lens board, through said blocks and thence to said drum.

References Cited in the file of this patent

UNITED STATES PATENTS

| | | |
|---|---|---|
| 715,125 | Niss | Dec. 2, 1902 |
| 1,142,904 | Morrell | June 15, 1915 |
| 2,767,630 | Karpf | Oct. 23, 1956 |